March 23, 1926.
F. J. SMITH
AUTOMOBILE SPRING
Filed Dec. 12, 1923
1,577,767
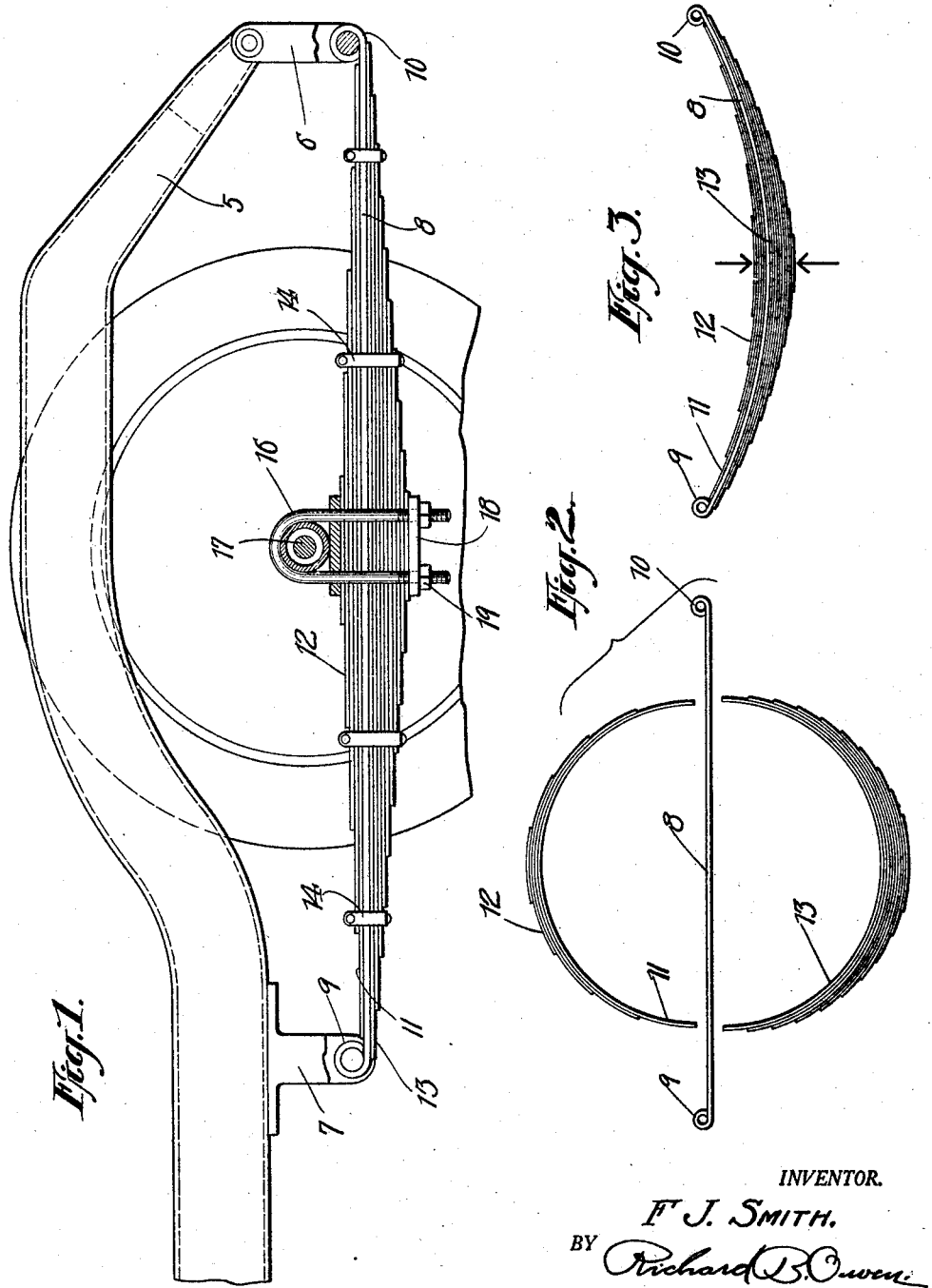
INVENTOR.
F J. Smith.
BY Richard B. Owen
ATTORNEY.

Patented Mar. 23, 1926.

1,577,767

UNITED STATES PATENT OFFICE.

FRANCIS JOSEPH SMITH, OF NEW YORK, N. Y.

AUTOMOBILE SPRING.

Application filed December 12, 1923. Serial No. 680,260.

*To all whom it may concern:*

Be it known that I, FRANCIS JOSEPH SMITH, a citizen of the United States, residing at New York city, in the county of New York and State of New York, have invented certain new and useful Improvements in Automobile Springs, of which the following is a specification.

This invention relates to suspension springs for motor vehicles and the like, and has for an object to produce a novel and improved spring of great flexibility and at the same time, great strength for supporting the weight of the vehicle and compensating for shocks and vibrations incident to travelling over rough roads.

One of the objects of my invention is to produce a suspension spring constructed of a plurality of superimposed, connected leaves which are originally bent in the form of a segment of a circle and then urged into substantial parallelism from opposite positions on opposite sides of a main leaf, before it is mounted on the chassis of a motor vehicle.

Another object of my invention is to produce a leaf spring of the character above specified consisting of an arbitrary number of superimposed, arched leaves, mounted on opposite sides of the main leaf, certain of the groups of leaves above and below the main leaf, compensating each other to aid distortion and resist strain incident to shocks and to permit the quick return of the spring as an entirety to its natural position.

To enable others skilled in the art to fully comprehend the underlying features of my invention that they may embody the same in the various modifications in structure and relation contemplated, drawings depicting a preferred form have been annexed as a part of this disclosure, and in such drawings similar reference characters denote corresponding parts throughout the several views, of which, Figure 1 is an enlarged view showing the application of my invention to the chassis and axle of a motor vehicle.

Figure 2 is a diagrammatic view of the main leaf and the superimposed upper and lower curved or arched leaves, before they are attached.

Figure 3 is a view showing the normal condition of the spring as an entirety, before it is mounted on the chassis and the axle.

Referring to the drawings, wherein like reference characters denote corresponding parts throughout all the views, 5 designates the rear end of the frame or chassis of a motor vehicle, and 6 the end connecting link which together with the bearing or bracket 7 forms a support for the spring now to be described in detail.

Generally the spring consists of a main leaf 8 formed with an eye 9, 10, at each end thereof, for connection with the link 6 and the bracket or bearing 7 above referred to. In practice, I have found that by removing the temper and arch from an ordinary main leaf, the possibility of fracture is reduced to a minimum and a greater degree of relative movement is had. In support of this flat, soft main leaf, I provide a tempered spring steel leaf that is of much lighter material, and arched into a perfect semi-circle. For additional support, I superimpose nine more similar leaves that gradually decrease in length and have exactly the same curvature, that is, each supporting leaf would form a segment of the same circle. Referring to the drawing, this entire group of supporting leaves is indicated by the numeral 13, the lower group. They are arched downward in the center. Although I have shown but ten of such leaves superimposed under the main leaf, this number may be varied, depending upon the weight to be supported. All of the leaves are arched to the same degree, thus giving great flexibility and reducing the possibility of fracture to a minimum.

On the opposite or upper face of the main leaf, I provide a similar series of superimposed, similarly arched or curved leaves of tempered spring steel, as in the group above referred to, and this second group is designated by the numeral 11, five of such leaves being shown, or just one-half of the number in the lower group heretofore described. This upper group of leaves is arched and positioned just reverse to the lower group of leaves so that if both groups were placed together, they would form a substantial circle. Although I have shown but five leaves in what may be termed the upper group, it will be readily recognized that this number may be altered, depending upon the weight to be supported. Since the upper group of leaves is just one-half as strong as the lower group, when both are assembled on the main leaf, it will partly compensate the tendency of the strong lower group to remain in a semi-circular position. Consequently, the spring as an entirety, will be bowed or arched as shown by Figure 3, after the spring has been assembled.

Connecting the upper and lower leaves, I have provided a series of straps 14 and a U-shaped bolt 16 overlying the axle 17, which bolt is provided with a bearing plate 18 and the nuts 19, whereby the bolt will properly support the central portion of the spring on the axle. The weight of the machine will thus compensate for the resistance offered by the lower group of leaves, over and above that offered by the upper group, causing the spring to rest in a straight line.

From the above construction it will be seen that any jar or vibration incident to the spring as an entirety, will cause it to quickly leave and return to its normal position as shown in Figure 1, and that great flexibility and strength are at once afforded by this arrangement.

I am aware that leaf springs have been heretofore manufactured, consisting of a plurality of superimposed leaves, but each supporting leaf has been arched or curved slightly greater than the next adjacent leaf, with the result that unequal stresses and strains have caused the leaves to break, and have reduced the flexibility thereof. It will be seen from the above that my invention resides primarily in the flat, soft steel main leaf, the semi-circular arch, the same arch in all leaves, and the compensation of great strength in a supporting spring group, by forcing a weaker group into parallelism against it.

Having described my invention, what I claim as new and desire to secure by United States Letters Patent is:—

1. A suspension spring comprising a flat main leaf of soft steel, supported by a leaf of equal length that is a perfect semi-circle of tempered steel, of light weight, which, in turn, is supported by a plurality of superimposed, similarly arched leaves that gradually decrease in length, and that form segments of the same circle, the whole supporting structure being of a strength sufficient to support a weight at least twice as great as that of the car for which it is designed, and further comprising a second group of leaves that, in every way, is similar to the supporting group except in their number and strength, which is positioned reversely on the opposite side of the main leaf from the supporting group, and is urged into parallelism with the other group, to compensate for the difference between the weight being supported and the great strength of the supporting group.

2. A suspension spring comprising a main flat leaf, a plurality of superimposed leaves arched in a true semi-circle on the top of the main leaf, a plurality of superimposed leaves arched in a true semi-circle possessing twice the strength of the first mentioned leaves on the opposite side of the main leaf and means for securing all of said leaves while under tension.

3. A suspension spring comprising a main flat leaf, a plurality of superimposed leaves of varying length arched in a true-semi-circle on the top of the main leaf, a plurality of superimposed leaves of varying length arched in a true semi-circle on the opposite side of the main leaf, said last mentioned leaves being double the number and possessing twice the strength of the first mentioned superimposed leaves and means for securing all of said leaves to the main leaf while under tension.

In testimony whereof I affix my signature.

FRANCIS JOSEPH SMITH. [L. S.]